United States Patent [19]

Scaggs

[11] 4,008,186
[45] Feb. 15, 1977

[54] NOVEL FIRE-RETARDANT POLYMER

[75] Inventor: Anthony L. Scaggs, Sanford, Mich.

[73] Assignee: The Dow Chemical Company, Midland, Mich.

[22] Filed: Oct. 3, 1975

[21] Appl. No.: 619,335

[52] U.S. Cl. .................. 260/2.5 FP; 260/2.5 P; 526/258; 526/304
[51] Int. Cl.$^2$ ............... C08F 122/40; C08J 9/02; C08J 9/06
[58] Field of Search ............. 260/78.4 R, 78.4 D, 260/2.5 P, 2.5 FP; 526/258, 304

[56] References Cited

UNITED STATES PATENTS

| | | | |
|---|---|---|---|
| 3,506,624 | 4/1970 | Behrens | 260/78.4 D |
| 3,763,114 | 10/1973 | Saluti et al. | 260/78.4 R |

Primary Examiner—Harry Wong, Jr.
Attorney, Agent, or Firm—Ronald G. Brookens

[57] ABSTRACT

A new cellular thermosetting synthetic polymer prepared by polymerizing an aminophenyl ethanol and an unsaturated dicarboxylic anhydride.

The new synthetic polymer has self-extinguishing properties and exhibits low smoking characteristics and is useful as flame retardant insulation.

5 Claims, No Drawings

NOVEL FIRE-RETARDANT POLYMER

BACKGROUND OF THE INVENTION

This invention relates to a new chemical compound, namely, poly[N-(3-(1-hydroxyethyl)phenyl)maleimide], to a process for the preparation of said compound, and to the use of said compound in the fire-retardant area.

In the preparation of most self-extinguishing materials, it is often necessary to chemically bind a halogenated compound and a crosslinkable compound. Unfortunately, upon combustion these materials still generate substantial amounts of smoke containing varying amounts of toxic gases.

It has now been found that a synthetic polymer can be produced which is inherently low smoking, nondripping, and self-extinguishing characteristics, this polymeric compound can be utilized in numerous areas wherein self-extinguishing material is required.

The test employed herein to demonstrate self-extinguishing properties of the polymer accurately is ASTM Test No. D-1692 and serves to exemplify the self-extinguishing characteristic of the polymer when exposed to small scale ignition sources. It is well recognized by those skilled in the art, and should be clearly understood by others, that all organic polymers will burn when subjected to a sufficiently intense heat source (whether or not they contain fire-retardant additives or properties).

SUMMARY OF THE INVENTION

Poly[N-(3-(1-hydroxyethyl)phenyl)maleimide] is prepared by the polymerization of m-1-(hydroxyethyl) maleanilic acid, with the concurrent dehydration of the amic acid functionality to a cyclic imide.

DETAILED DESCRIPTION

According to a preferred embodiment the m-1-(hydroxyethyl) maleanilic acid can be prepared from an aminophenyl ethanol and an unsaturated dicarboxylic anhydride. Such preparation is accomplished by first dissolving a stoichiometric amount of maleic anhydride in a suitable solvent, e.g. chloroform. An equivalent amount of hydroxyethyl aniline is also dissolved in a separate amount of suitable solvent, e.g. chloroform. The hydroxyethyl aniline solution is then added to a reaction vessel equipped with a stirrer, a condenser, and an addition funnel. The maleic anhydride solution is added at such a rate that the resulting exothermic reaction is controlled. The resultant product, m-1-(hydroxyethyl)maleanilic acid is suction filtered, washed with chloroform, benzene, or other suitable solvents, and dried. The dried product is a yellow solid with a melting point of 169–171° C. This thermoplastic polymer is formed because of the dehydration which occurs concurrent with the polymerization process. Due to the release of water during the polymerization of the maleanilic acid, poly[N-(3-(1-hydroxyethyl)phenyl)-maleimide] is obtained as a foam when such polymerization is carried out at atmospheric pressure. Such dehydration transforms the amic acid functionality of the maleanilic acid to a cyclic imide. The reaction may be illustrated as follows:

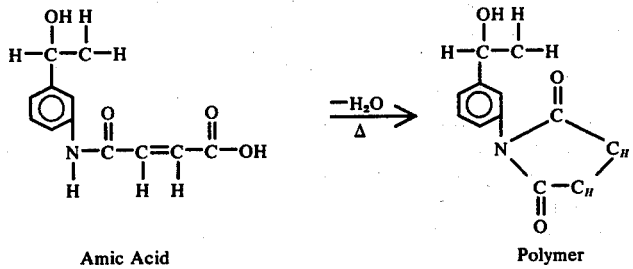

Amic Acid            Polymer

Utilization of suitable blowing agents and surfactants act to improve the characteristics of the foamed product.

Exemplary of monomers which may be substituted for maleic anhydride are citraconic anhydride and the halogenated derivatives of both citraconic and maleic anhydride.

Illustrative of substitutes for m(alpha-hydroxyethyl)aniline, are isomeric hydroxyethyl anilines and their substituted derivatives. Said substitutes are illustrated as follows:

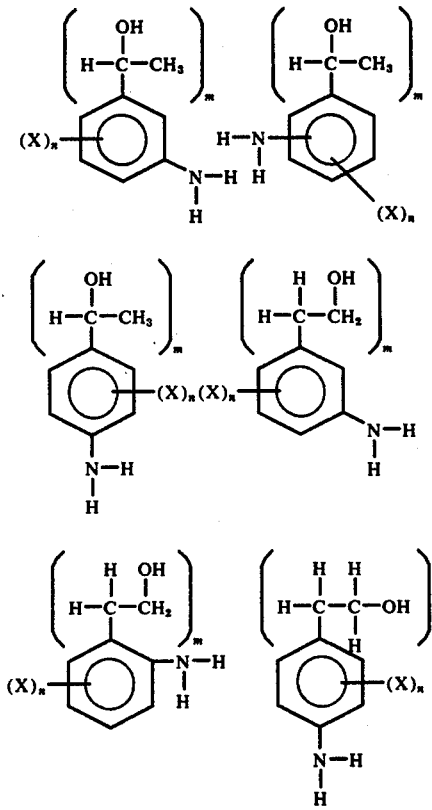

wherein m is an integer from 1 to 5, n is an integer from 0 to 4, and wherein X is a halogen, an alkyl or an aromatic group.

The following example illustrates the invention.

EXAMPLE 1

A sample of the maleanilic acid, prepared as outlined above and containing a blowing agent, (Celogen RA, 10% by weight) and a surfactant (Alipol EP-120, 10% by weight), is placed in an oven for 60 minutes at 175° C. The resulting maleimide is a soluble cellular polymer which is yellow or orange in color. Said polymer is formed through the C=C double bond. The hydroxyl on the ethyl group remains unchanged as shown by infrared spectroscopy. It is found to be nondripping, low smoking and self-extinguishing (ASTM Test No. 1692) and can be useful as a flame retardant insulation.

What is claimed is:

1. Poly[N-(3-(1-hydroxyethyl)phenyl)maleimide].

2. A process for the preparation of poly[N-(3-(1-hydroxyethyl)phenyl)maleimide] comprising polymerizing the product derived from the reaction of an aminophenyl ethanol and an unsaturated dicarboxylic anhydride.

3. Process for the preparation of poly[N-(3-(1-hydroxyethyl)phenyl)maleimide] comprising polymerizing the product derived from the reaction product of an aminophenyl ethanol and an unsaturated dicarboxylic anhydride wherein the aminophenyl ethanol is selected from the group consisting of hydroxyethyl aniline, isomeric hydroxyethyl anilines and the halogenated, alkylated and aromatic substituted derivatives of both hydroxyethyl aniline and isomeric hydroxyethyl anilines.

4. Process for the preparation of poly[N-(3-(1-hydroxyethyl)phenyl)maleimide] comprising polymerizing the product derived from the reaction product of an aminophenyl ethanol and an unsaturated dicarboxylic anhydride wherein the unsaturated dicarboxylic anhydride is selected from the group consisting of maleic anhydride, citraconic anhydride, and the halogenated derivatives of citraconic and maleic anhydride.

5. Process for the preparation of poly [N-(3-(1-hydroxyethyl)phenyl)maleimide] comprising polymerizing m-1-(hydroxyethyl)maleanilic acid.

* * * * *